Jan. 2, 1934.  W. J. MILLER ET AL  1,942,035
PROCESS AND APPARATUS FOR FEEDING GLASS
Filed Dec. 20, 1929  4 Sheets-Sheet 1
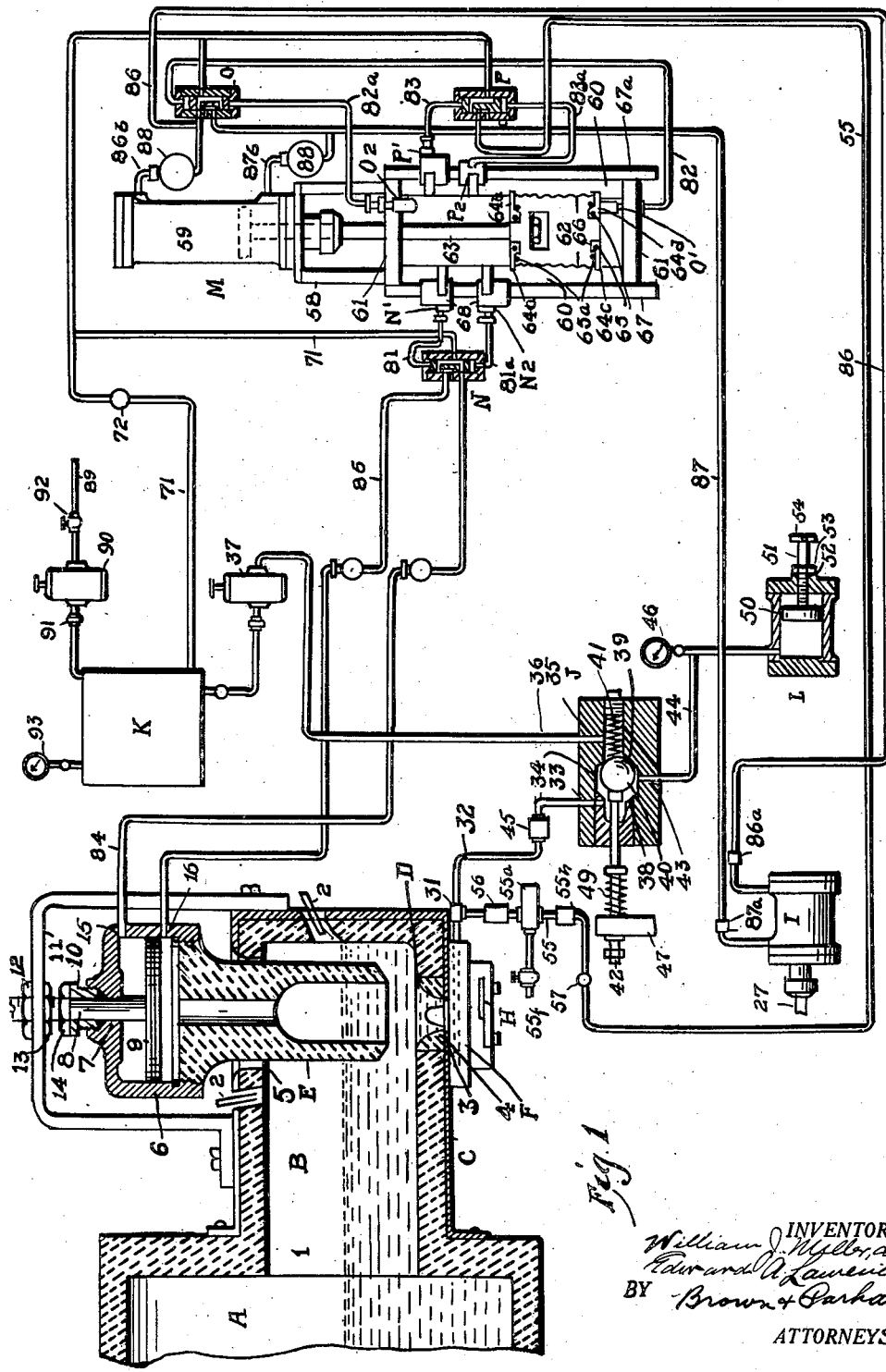
INVENTORS
William J. Miller, and
Edward A. Lawrence,
BY Brown & Parham
ATTORNEYS

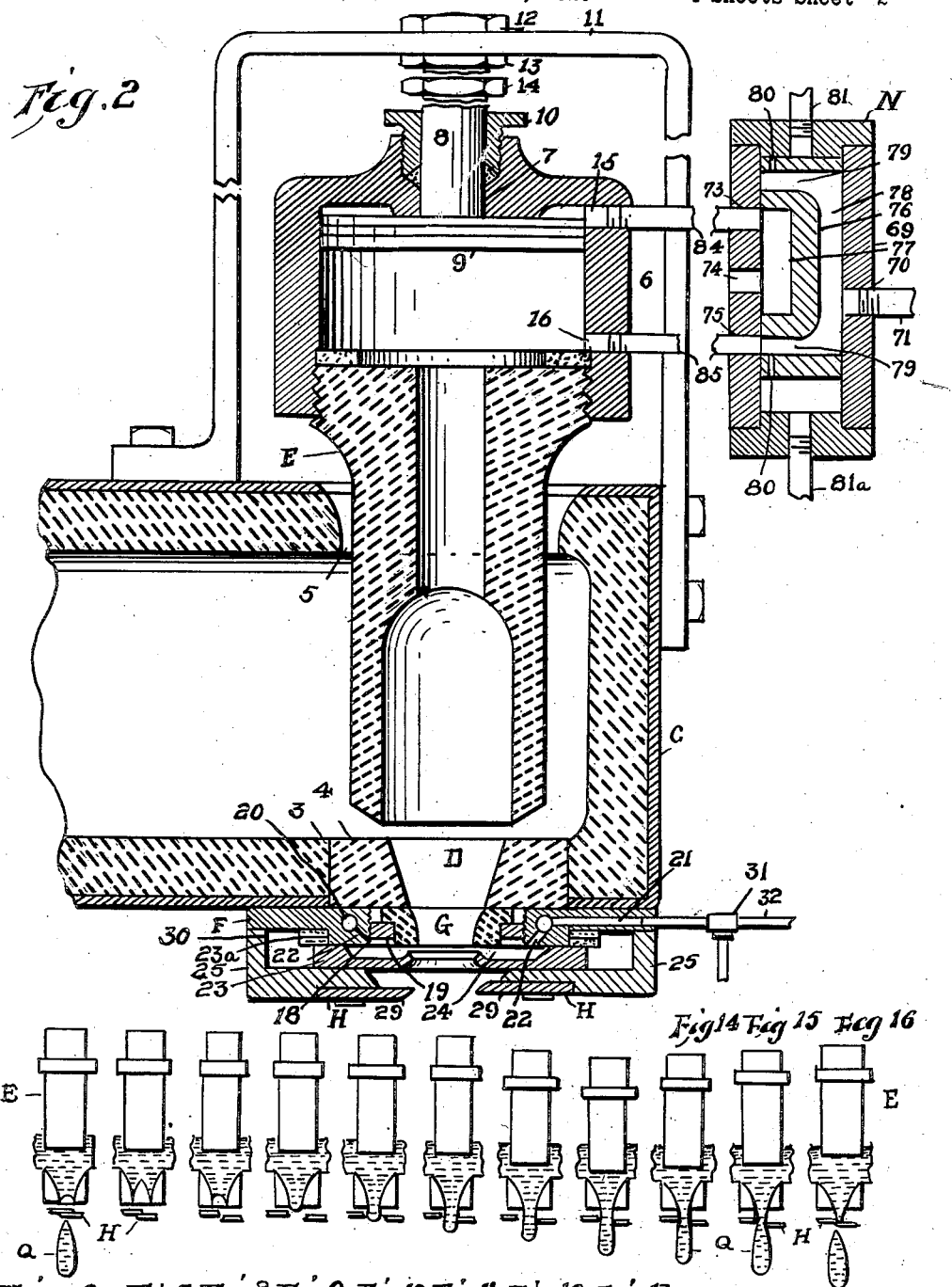

Jan. 2, 1934.  W. J. MILLER ET AL  1,942,035
PROCESS AND APPARATUS FOR FEEDING GLASS
Filed Dec. 20, 1929  4 Sheets-Sheet 3
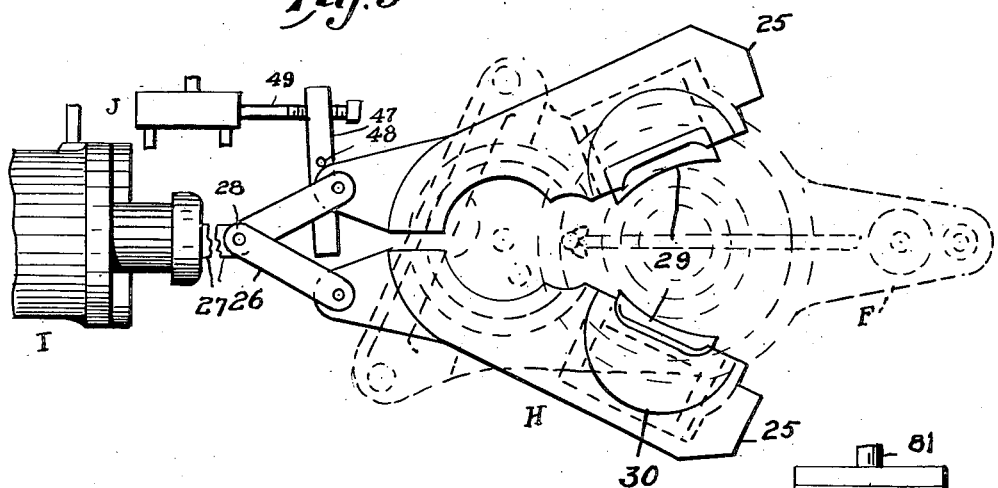
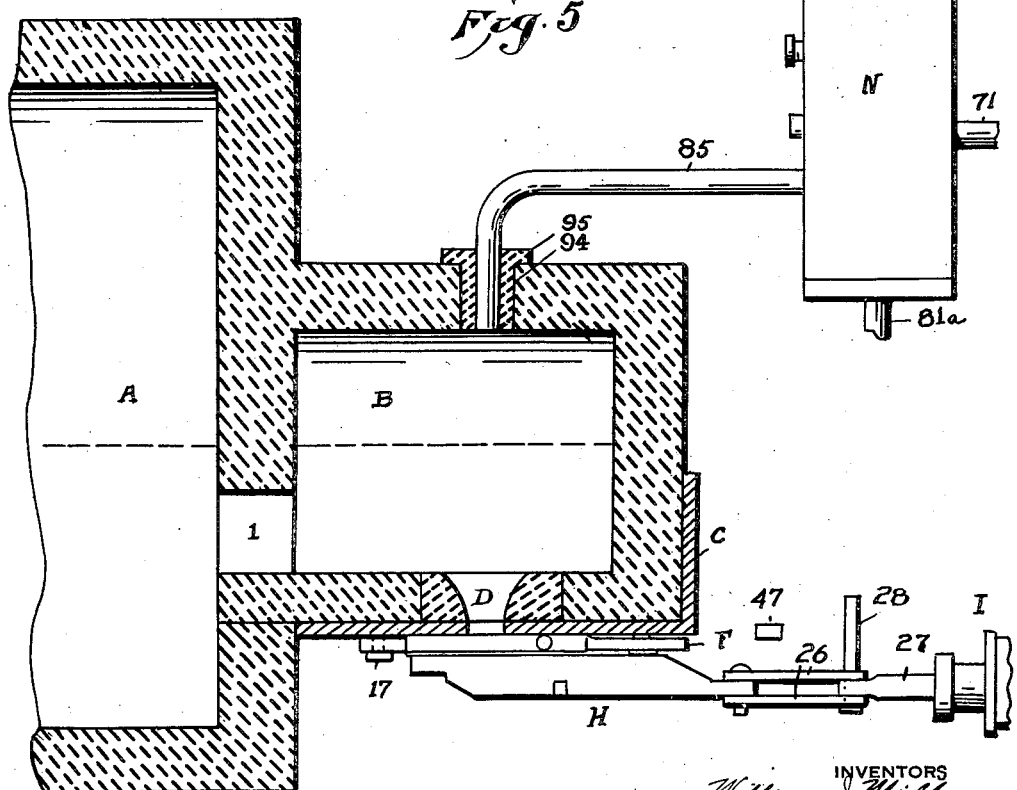

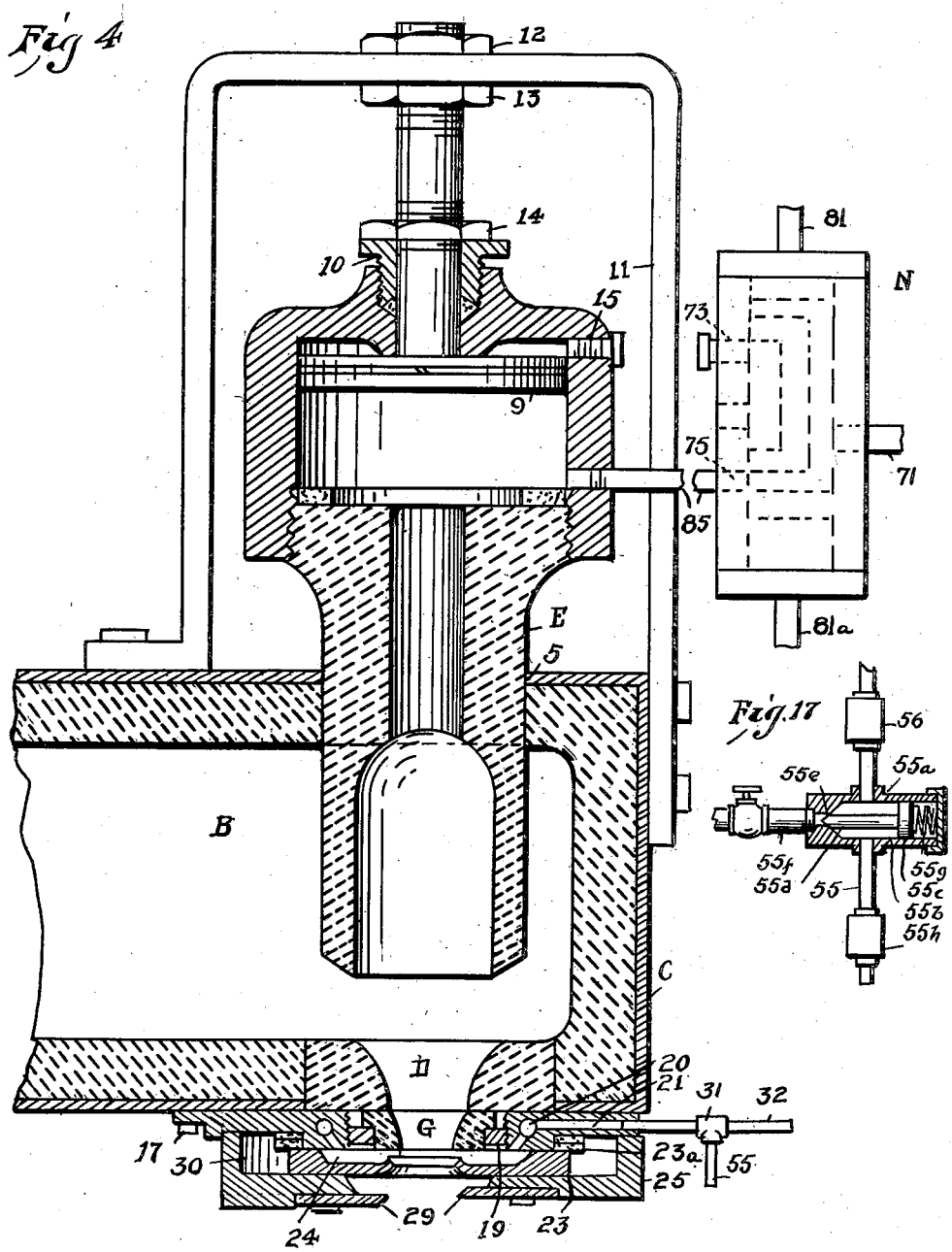

Patented Jan. 2, 1934

1,942,035

UNITED STATES PATENT OFFICE 1,942,035

PROCESS AND APPARATUS FOR FEEDING GLASS

William J. Miller, Swissvale, and Edward A. Lawrence, Bellevue, Pa., assignors to Hartford-Empire Company, Hartford, Conn., a corporation of Delaware Application December 20, 1929
Serial No. 415,625

22 Claims. (Cl. 49—55)

This application is in part a continuation of application Serial Number 325,616 filed in the United States Patent Office on September 23rd, 1919.

Our invention consists in certain new and useful improvements in process and apparatus for feeding glass through the discharge outlet of a tank or other container of molten glass, to form gobs or mold charges for fabricating machinery.

Numerous processes and apparatus have been designed for the automatic feeding of glass in the form of separate mold charges.

Thus the glass has been allowed to flow by gravity through the discharge outlet, the stream being intermittently sheared off, either close up to the outlet or on a plane spaced below the outlet, to form the mold charges. However, glass flowing by gravity tends to string out, and mold charges formed by this method are objectionable as they tend to pile up and overlap in the mold, impairing the quality of the ware pressed or blown, or pressed and blown therefrom. Again, the use of shears for severing the stream results in a chilled and hardened end or stub which forms the lower end of the next succeeding mold charge, the presence of which hardened and scarred portion impairs the quality of the fabricated ware. It has long been recognized in the art that a gob or mold charge formed while suspended in the air below the discharge outlet is, for many kinds of ware, much superior to a mold charge accumulated in a mold or other receptacle, but it has been found impossible to form and properly shape such suspended gobs from a stream of glass flowing by gravity only through the discharge outlet.

Various methods have therefore been devised for shaping the gobs of glass while suspended below the outlet. Thus it has been proposed to use fluid impulses, intermittently applied to the glass above the outlet, to assist gravity in extruding the glass through the outlet, thereby maintaining the diameter of the gob and preventing the stringing out of the glass, the glass, depending in the form of a suspended gob below the outlet, being sheared off after each extrusion, and the detached gob dropping down into the waiting mold.

For the purpose of eliminating the hardened and scarred stub, left by the shearing operation, it has been proposed to apply to the surface of the glass above the outlet, after each shearing operation, sub-atmospheric pressure or "vacuum", for the purpose of sucking the severed stub up into the orifice into a zone of remelting heat to eliminate the hardened scar.

It has been found in practice however that the results obtained by this method have not been entirely satisfactory, owing, inter alia, to the fact that the void caused by the application of vacuum is more easily satisfied by the hotter glass flowing from the source of supply towards the outlet than it is by the colder glass depending in and through the discharge outlet. Thus the retraction of the stub is not uniformly or satisfactorily accomplished.

In another and more or less contemporary line of development in the art of feeding glass, a rigid member, usually a refractory clay implement or plunger, has been reciprocated in the molten glass in relation to the discharge outlet to alternately extrude the glass and then, subsequent to the shearing off of the protruding gob, lift the stub off the shears.

In this method, instead of variations in fluid pressure, the tendency of the glass to adhere to the heated clay of the plunger and the cohesion of glass to glass are largely relied upon.

One of the objects which we have in view is the production of a succession of gobs or separate mold charges through the use of impulses, such as fluid pressure or pneumatic impulses applied alternately to the top surface of the glass above the outlet and to the severed stub below the outlet. Such mold charges may be of the suspended type, or partially suspended having their lower end in the molds when severed.

Thus to provide an extrusion of the glass through the outlet at a rate greater than gravity flow, thereby properly shaping the gob and preventing the formation of a long stringing mass of glass, we may apply at proper intervals an impulse of fluid pressure to the surface of the glass above the outlet, thus forming a gob or charge of glass suspended from and below the outlet.

This gob of glass is then severed and drops into the waiting mold, and we then apply to the sheared stub a fluid pressure or pneumatic impulse sufficient to drive it up into the zone of remelting heat for the elimination of the shear-scar and to hold the stub elevated within the outlet for a sufficient time to provide the predetermined spacing or dwell between successive gobs.

By properly regulating the successive impulses applied to the glass above the outlet, both as to intensity, duration and frequency, we are able to form gobs of any desired size and shape, within reasonable limits.

Again by regulating the frequency, duration and intensity of the applications of fluid pressure impulses at the lower end of the outlet to retract and hold elevated the sheared stub, we are enabled to eliminate the shear marks and to produce, in coaction with the extruding impulses, the desired frequency and character of gob formation.

A marked advantage in our use of fluid pressure impulses applied to the glass above the outlet in our process and apparatus is that we are enabled to work the glass at a relatively high temperature. Thus, we are able to deliver relatively hot mold charges to the fabricating machine. In small and delicate hollow ware and thin blown ware, it is frequently desirable for successful fabrication to have the mold charges at such relatively high temperature. Furthermore, in our method of retracting the sheared and hardened stub, the glass is elevated in what might be termed a dome formation, in which the sheared stub is turned inside out, entirely remelting the chilled glass and amalgamating it with the hotter glass.

In the case of numerous characters of mold charges or gobs, a tapered upper end is unobjectionable or even desirable; and in such cases, it is the practice to "neck" or attenuate the upper end of the gob, where it is attached to the walls of the orifice, to facilitate shearing.

In reciprocating plunger feeders, "necking" usually is accomplished by starting the plunger on its upstroke before the shears sever the neck. Thus, the neck is attenuated and the shears cut the same more readily.

We therefore provide for necking prior to detaching the gob. Our preferred method of necking shown is by directing against the neck of glass which attaches the gob to the outlet a blast of fluid pressure directed from all sides and preferably slightly upwardly toward the outlet, the fluid being preheated to prevent chilling and hardening. The fluid may be a combustible gaseous fluid or mixture which is ignited by the heat, thus preventing chilling and facilitating necking.

The shears then close and sever the neck, allowing the gob to drop into the mold.

As the shears close, the fluid pressure impulse for retracting the stub is applied to the lower end of the outlet.

Various means for applying the fluid pressure impulses to the surface of the glass above the outlet may be used. As our preferred means, and as illustrative of practical means for such purpose, we provide a tube which extends down through the roof of the shallow extension or "boot" of the furnace, into the body of molten glass contained therein, and in alinement with the discharge outlet of the boot.

To confine the influence of the extruding impulses we prefer to cause the tube to approach the outlet for the extruding operation, thereby directing the fluid pressure impulse against the molten glass at or directly above the outlet, and thus effecting successfully the discharge of glass at a rate greater than that of natural gravity flow, dependent on the character of the impulse, to prevent premature necking or gob attenuation and to produce the desired shape. Likewise we prefer to elevate the tube in the molten glass, when the extrusion has been accomplished and before or about the moment the fluid impulse is applied to the lower end of the discharge outlet to retract the stub. This will facilitate the stub retraction by permitting a freer movement of the glass at the orifice and may be employed to lift the sheared stub up off the shears before the fluid pressure impulse is applied at the lower end of the outlet. However, the tube may be fixed in position, relative to the outlet.

As a substitute for our preferred form of mechanism we also illustrate another embodiment wherein the extruding impulses of fluid pressure are delivered into the upper portion of the boot above the surface of the molten glass, precautions being observed to prevent dissipation of the pressure except as the same is exerted in the extruding function.

To enable us to properly synchronize the operations of the various operative elements or mechanisms, we provide for the automatic control of such operations, and for the regulation and relative adjustments of the same.

In the accompanying drawings, which are, however, merely intended to illustrate practical embodiment of the principles of our invention without limiting the scope of the latter, Fig. 1 is a diagrammatic view of an automatic feeder mechanism embodying the principles of our invention, the tube being shown in its elevated position, the shears being shown closed and the stub retracted; Fig. 2 is an enlarged detail in vertical section of the feeder proper, the tube being shown in its depressed position with the extruding fluid pressure impulse applied, and the shears being shown open; Fig. 3 is an inverted plan view of the shear mechanism, showing also the operative connection between the same and the valve controlling the application of the fluid pressure impulses for retracting the stub; Fig. 4 is a view similar to Fig. 2 but showing the tube fixed in position; Fig. 5 is a view similar to Figs. 2 and 4 but showing a modification, and Figs. 6 to 16 are diagrammatic views illustrating our preferred method of feeder operation. Fig. 17 is an enlarged detail of part of Fig. 1.

The following is a detailed description of the drawings.

A represents a glass tank or other source of supply of molten glass, and B is a boot or shallow extension thereof which is supplied with molten glass from the tank by any convenient means, as by the open port 1, thus maintaining the same level of glass in the boot as in the tank. The boot is preferably provided with heating means, such, for instance, as the gas burners 2 extending through ports in the walls and roof of the boot. The boot like the tank is built of refractory material.

The refractory material of the boot is supported by a metal boxing C which is anchored to and supported from the front of the tank A.

The boot is provided with a discharge opening 3, shown in the floor of the boot and in which is mounted the clay bushing 4 whose downwardly tapered bore forms the feeding outlet D of the boot. The boxing C is provided with an orifice registering with the opening 3 in the floor of the boot, into which the lower end of the bushing 4 extends.

5 is an orifice in the roof or wall of the boot, axially alined with the feeding outlet D, and through which extends down into the molten glass the clay tube E. The tube E, as will hereafter be more fully described, may be stationary, but we prefer to make the same vertically movable in relation to the outlet D. Thus we have shown the same secured in the lower end of a metal cylinder 6 whose upper end is closed except for an axial opening 7 which has a sliding fit on the piston stem 8. 9 is a piston rigidly mounted on the stem 8 and working in the cylinder 6. A packing gland 10 is mounted in the upper end of the opening 7 so as to prevent the escape of fluid pressure from the upper end of the cylinder 6.

The piston and its stem are supported by means of a metal frame 11 mounted on the boot, the upper end of the piston stem being threaded and extending up through a hole in the horizontal portion of the frame. 12 and 13 represent nuts screwed on said stem against the upper and lower faces of the frame, thereby permitting adjustment of the position of the piston 9 and enabling it to be held rigidly in its adjusted position.

14 represents a nut or nuts adjustable on the piston stem 8 so that the limit of the upward movement of the cylinder 6 on the stem may be varied or regulated.

The upper bore of the tube E is preferably of less diameter than its lower bore, which latter is preferably of at least as great diameter as that of the upper end of the feeding outlet D and may be of even larger diameter than the upper end of said orifice. The lower external diameter of the tube E, however, should be of less diameter than the internal diameter of the cylinder 6, so that the tube and cylinder will move downwardly when fluid pressure is admitted below the piston.

15 is a port in the upper end of the cylinder 6 for the admission of fluid pressure above the piston 9, and 16 is a similar port in the lower end of the cylinder. Said ports have their outer ends threaded for the attachment of flexible fluid pressure pipes, thereby providing for the elevation and depression of the cylinder 6 and the tube E relative to the stationary piston 9.

F is a metal casting or plate, whose contour is indicated by dotted lines in Fig. 3, and which is removably secured, as by bolts 17, to the boxing C. Said plate is provided with a circular orifice 18 whose wall is threaded to receive the supporting ring 19 which holds in place the interchangeable clay mouth ring G which determines the size of the lower end of the feeding outlet D, and thus regulates the diameter of the gobs.

20 is an annular chamber in the casting F which surrounds the orifice 18 and which is connected with the front end of the casting by the passage 21 whose outer end is threaded for pipe connection.

22 represents a plurality of ports in the casting F, disposed in annular series and leading downwardly from the chamber 20 to the lower face of said casting and converging toward the orifice 18.

23 is an annular cast metal disk which is bolted or otherwise attached to the under face of the casting F. The inner portion of the upper face of the disk 23 is countersunk so as to form a chamber 24 surrounding the lower end of the mouth ring G, the inner annular edge of said disk being preferably turned upwardly toward the mouth ring but spaced below the same. The lower ends of the ports 22 communicate with said chamber 24. 23a represents asbestos packing rings compressed between the casting F and the disk 23 to make a substantially air-tight joint.

H represents the shears, the same being shown as of the inclosed or box type. Such shears are of the following general construction. 25 represents a pair of coacting shear arms which are mounted in pivotal relation to each other on the underside of the casting F. The rear ends of the arms 25 are connected by the links 26 to the end of the piston rod 27 of the shear cylinder I, the pivot pin 28 which connects the links to the piston rod protruding upwardly for a purpose to be described. The shear blades 29 are clamped on the arms 25. The arms 25 are provided with arcuate shoulders 30 which surround the disk 23 and press against the outer edges of the packing rings 23a when the shears are closed, thus forming with the overlapped shear blades an inclosure for the lower end of the feeding outlet which will prevent the material escape of fluid pressure.

At the front of the casting F a pipe T 31 is connected to the outer end of the passage 21, the other end of the head of said T being connected by a pipe 32 with the discharge port 33 of the operative valve J. The port 33 leads into one end of the chamber 34 of said valve while the other end of the said chamber has a port 35 connected by a pipe 36 to the compressed air supply tank K. An adjustable pressure reducing valve 37 is preferably interposed in the pipe 36. 38 and 39 are opposed ball seats in the chamber 34 of the valve J, and 40 is a ball valve adapted to close either of said seats, but normally held by the spring 41 against the seat 38 to seal the port 33, leaving the port 35 open. A protruding push rod 42 is provided whereby the ball may be shifted from the seat 38 to the seat 39, thus opening the port 33 and closing the port 35. A third and open port 43 in the chamber 34 is connected by a pipe 44 with the reservoir L. It is evident that when the port 33 is closed and the port 35 is open the reservoir is replenished with fluid pressure from the tank K, and when the port 33 is open and the port 35 closed, the fluid pressure escapes from the reservoir L through the pipe 32 and passage 21 into the annular chamber 20 whence it escapes through the ports 22, and being confined by the closure of the shears, exerts its impulse against the sheared stub of glass, retracting the same up into the outlet into the zone of remelting heat. The fluid is heated by its passage through the chamber 20 to prevent material chilling of the glass by the impact of the fluid.

The pipe 32 is provided with a check valve 45 to prevent back pressure. The reservoir is preferably provided with a sight-gauge 46.

47 is a rocking lever mounted intermediate of its end on the vertical pivot 48, one end of the lever being provided with a spring impact bolt 49 adapted to impinge against and push inwardly the push rod 42 when the other end of the lever is struck by the pivot pin 28 on the piston rod 27 as the shears close.

Thus with the closing of the shears, which severs the depending gob, an application of fluid pressure is made to the lower end of the feeding outlet, thus forcing the severed stub upwardly in the outlet into a zone of remelting heat.

To properly regulate this retraction, the amount of fluid pressure admitted to the bottom of the feeding orifice should be measured so that the stub will not be driven up into the body of the molten glass in the boot B which would result in the formation of air bubbles. On the other hand the dwell must be sufficient to properly space the gobs apart and to regulate the quantity of glass desired in the individual gobs. Thus the reservoir L is a measuring reservoir and is made adjustable, so as to contain the desired volume of fluid pressure, by means of an internal false head or piston 50 which is attached to the inner end of a screw shaft 51 extending through a threaded hole 52 in the end of the reservoir and provided with a packing gland 53. The outer end of the shaft 51 is provided with a spoked handle 54 for shifting the false head. Thus the volume of fluid pressure admitted to the lower end of the outlet for retraction may be properly regulated, and by adjusting the pressure valve 37 the proper pressure may also be obtained.

While retraction might be effected by admitting fluid pressure from a live air line, we prefer to use as a supply the measuring reservoir shown, since the retractive impulse should be of progressively diminishing pressure, so that as the inertia of the stub is overcome and it tends to move upwardly more easily, the diminishing pressure will compensate for the decreasing resistance, and thus prevent the blowing of the stub back up into the boot. As the pressure becomes dissipated, the glass again resumes its downward flow in the outlet. This dwell or interval may be nicely regulated by the use of the adjustable measuring reservoir.

The depending stem of the T 31 is connected to a pipe 55 through which a blast of high pressure is admitted just before the shears close, thus directing against the neck of the gob from all sides a strong blast of compressed fluid which acts to thin the neck preparatory to cutting. As the shears close this necking blast is cut off. The pipe 55 is provided with a check-valve 56 to prevent back pressure in said pipe. 57 is a globe valve to cut the necking blast out of service when desired.

The air or other fluid used for the necking blast is preheated by its passage through the annular chamber 20.

To prevent the neck chilling and hardening and to facilitate the necking or attenuation, we may use for the necking blast a combustible gaseous mixture which will be ignited by the heat at the outlet. Thus, in Fig. 1 we have shown a gas connection to the blast pipe 55, the same being illustrated on larger scale and in sectional view in Fig. 17, wherein 55a is a T fitting interposed in the pipe 55 having at one end a piston chamber 55b in which works a piston 55c, to which piston is attached a needle valve 55d adapted to be seated in the valve seat 55e which is connected to the gas supply pipe 55f to which gas is supplied under proper pressure. The needle valve is normally held closed by the helical spring 55g. When the blast pressure is admitted to the pipe 55 the same causes the piston 55c to retreat, opening the needle valve and admitting the gas into the blast pipe 55 where it is mixed with the air or other fluid pressure. When the blast is off of the pipe 55 the needle valve is closed by the spring to prevent gas leakage. We also prefer to provide the pipe 55 with an adjustable pressure valve 55h to regulate the pressure of the blast regardless of any fluctuation in the main line.

The admission of fluid pressure to the ports 15 and 16 of the tube cylinder 6 to the opposite ends of the shear cylinder I, and to the necking blast pipe 55 is controlled and synchronized by a suitable timing mechanism in which proper adjustments are provided for.

As an efficient device for this purpose we have shown at M the fluid pressure timing device which is the subject matter of Letters Patent of the United States No. 1,549,206 issued to William J. Miller on August 11th, 1925.

Briefly, the construction of the timer M shown, is as follows.

58 is a base or support mounted in any convenient position, such as vertically disposed on the front of the glass tank. At its one end, preferably its upper end is mounted the fluid pressure cylinder 59. 60 are spaced apart guide rails on said support connected together at their ends by the cross bars 61. 62 is a block slidably mounted on said rails 60 and rigidly attached to the end of the piston rod 63 attached to the piston working in the fluid pressure cylinder 59. The block 62 is provided with a plurality of actuating fingers, shown at 64a, 64b, 64c and 64d, said fingers being pivotally mounted on the block as by pivot pins 65. Stop pins 65a are provided so that the fingers 64a and 64b can swing only toward the cylinder 59 while the fingers 64c and 64d can swing only in the opposite direction. The fingers are resiliently held against their stop pins, as by the helical spring 66 connecting together the fingers 64a and 64c, and 64b and 64d, respectively.

67 and 67a represent bars parallel with the rails 60 upon which are slidably mounted the carriers 68, each of which support a hooded bleeder valve whose head protrudes into the path of one of the fingers 64.

N, O and P represent three automatic valves, the valve N being associated with the tube cylinder 6; the valve O with the shear cylinder I, and the valve P with the necking blast pipe 55.

The structure of said valves is well known in the art and is shown on enlarged scale in Figs. 2 and 4. Briefly the valve casing 69 is provided at one side with a port 70 connected with a branched fluid pressure pipe 71 which leads from the tank K and is provided with a globe valve 72. On its opposite side the casing is provided with three longitudinally alined ports 73, 74 and 75, the central port 74 being a pressure relief port open to atmosphere. 76 is a valve body longitudinally slidable in the casing 69 and provided on one side with a recess 77 so positioned and proportioned that when said body is at one end of the casing the port 73 is connected to the relief port 74, but when it is at the other end of the casing the port 75 is connected to the relief port 74. The opposite side of the body 76 is provided with a recess 78 which is always in communication with the pressure port 70, and at either end of said recess 78 the body is provided with diametric ports 79 so located that when one of the ports 73 or 75 is connected to the relief port 74, the other port 75 or 73 is connected to the fluid pressure port 70. 80 represents small bleeder passages which connect the diametric ports 79 with the ends of the casing so that fluid pressure will tend to gradually build up in the ends of the casing after a relief thereof. The opposite ends of the valve casing are connected by pipes with hooded bleeder valves which are actuated in proper sequence by the fingers 64 of the timer M.

Thus the opposite ends of the automatic valve N are connected by the pipes 81 and 81a to the hooded bleeder valves N' and N2. The opposite ends of the valve O are connected by the pipes 82 and 82a to the bleeder valves O' and O2. The opposite ends of the valve P are connected by the pipes 83 and 83a to the bleeder valves P' and P2.

The port 73 of the automatic valve N is connected by a pipe 84 with the port 15 of the cylinder 6, while a pipe 85 connects the valve port 75 with the port 16 of the cylinder 6. Thus when the valve body 76 is shifted, by the actuation of the bleeder valve N' into the position shown in Figs. 1 and 6, fluid pressure is admitted to the cylinder 6 below the piston 9 and relieved from said cylinder above said piston, thus lowering the tube E. On the other hand, when the valve body is shifted to the opposite end of the casing by the actuation of the bleeder valve N2, fluid pressure is admitted to the cylinder 6 above the piston and relieved below the latter, thus raising the tube E.

The port 73 of the automatic valve O is connected by the pipe 86, provided with a cushion valve 86a, to the rear end of the shear cylinder I, while the pipe 87, provided with cushion valve 87a, connects the port 75 of said valve with the front end of the shear cylinder. Thus when the valve body of the automatic valve O is shifted, by the actuation of the bleeder valve O2 to the position shown in Fig. 1, the shears are closed, detaching the gob and applying fluid pressure to the lower end of the discharge outlet D to retract the stub while the fluid pressure is simultaneously relieved from the front end of the cylinder. When the valve body is shifted to the opposite end of the casing of the valve O by the action of the bleeder valve O', fluid pressure is applied to the front end of the shear cylinder and relieved from the rear end, thus opening the shears and cutting off communication between the blast chamber 20 and the reservoir L.

The port 73 of the automatic valve P is connected with the necking-blast pipe 55 while the port 75 of said automatic valve is plugged. Therefore when, by the actuation of the bleeder valve P', the valve body assumes the position shown in Fig. 1, the end of the pipe 55 is connected to atmosphere, but when, by the actuation of the bleeder valve P2 the body is shifted to its opposite position, the pipe 55 is connected up to the fluid pressure pipe 71 and necking blast is directed against the neck of the gob.

The upper or outer end of the timer cylinder 59 is connected to the pipe 86b with the port 73 of the automatic valve O, and the lower or inner end of said cylinder 59 is connected by the pipe 87b to the port 75 of said valve O. Thus when the valve O is actuated to admit pressure to the rear end of the shear cylinder I to close the shears, it also admits pressure to the upper end of the cylinder 59 and relieves the pressure from the lower end thereof, thereby causing the block 62 to move downwardly. Again when the valve O is shifted to admit pressure to the front end of the shear cylinder I, pressure is also admitted to the lower end of the cylinder 59 and relieved from the upper end thereof, and the block 62 is moved upwardly.

The bleeder valve O' is mounted on the lower cross bar 61 of the bed 58 in the path of the finger 64d so that when the block 62 reaches the lower end of its travel the bleeder valve O' is actuated and the valve body of automatic valve O shifted to admit pressure to the lower end of the cylinder 59 and to the front end of the cylinder I and to relieve the pressure from the opposite ends of said cylinders, thus reversing the travel of the block 62 and opening the shears. The bleeder valve O2 is mounted on the upper cross bar 61 of the bed 58 in the path of the finger 64b so that when the block 62 reaches the upper end of its travel, the automatic valve O is shifted to cause the block 62 to start its downward travel and to shut the shears and sever the gob.

88 represents adjustable cushion valves, well known in the art, and interposed in the pipes 86b and 87b to enable the regulation of the response of the piston in the cylinder 59 to the shifting of the automatic valve O.

The bleeder valves N' and N2 are slidably mounted on the bar 67 of the bed 58 while the bleeder valves P' and P2 are slidably mounted on the opposite bar 67a, the carriers 68 of said valves being fixable in their adjusted position, as by set screws.

The tube E is depressed as the fluid pressure is applied to the surface of the glass to extrude the glass and the shears are opened previously to the application of the extruding pressure impulse. Therefore the bleeder valve N2 is so located that as the block 62 begins to rise, the finger 64a will actuate the bleeder valve N2 and shift the automatic valve N so that the tube E will be depressed toward the orifice D and the extruding fluid pressure established in said tube on top of the glass. When the finger 64a moves past the bleeder valve N' it actuates it and thus reverses the automatic valve N, thereby cutting off the extruding impulse from the tube E and elevating said tube to give clearance for the retraction of the stub. When the block 62 reaches its top position the bleeder valve O2 is actuated by the finger 64a, and the shears are closed, severing the gob and applying the retracting impulse to the lower end of the outlet.

When the block 62 is moving downward the finger 64a trails past the bleeder valves N' and N2 without actuating them and therefore the automatic valve N is not shifted. By adjusting the bleeder valves N' and N2 along the path of the block 62 their actuation may be timed to produce any desired prolongation of the extruding impulses and any desired dwell between the same.

The finger 64c is not, as shown, used, but may be used for actuating another bleeder valve or bleeder valves as for starting or stopping a fabricating machine or for other like purposes.

The bleeder valves P' and P2 which control the application of the necking blast, which is applied just before the shears close to detach the gob, are located in the path of the finger 64b while the block 62 is moving upwardly. The finger first engages and actuates the bleeder valve P2 which shifts the automatic valve P to admit the fluid pressure to the pipe 55, and then, just before the bleeder valve O2 is actuated to close the shears and sever the gob, the bleeder valve P' is actuated, shifting the automatic valve P and cutting off the necking blast so that it will not interfere with the application of fluid pressure from the reservoir L which retracts the stub after the shears close.

The bleeder valves P' and P2 may be adjusted to properly time and prolong the necking blast. Said valves are not actuated by the finger 64b on its downward movement.

The tank K is kept supplied with fluid pressure through a pipe 89 leading from a compressor or air pump, not shown, and a suitable adjustable pressure valve 90 is interposed in said pipe to properly regulate the pressure in the tank K. 91 is a check valve to prevent the backward escape of pressure from the tank K, and 92 is a globe valve in the pipe 89. 93 is a sight gauge on the tank K.

The cycle of operation of the feeding mechanism just described is graphically indicated in Figs. 6 to 16, inclusive.

Thus in Fig. 6 the shears have just closed, detaching the gob Q and the retractive impulse from the reservoir L is being applied to the lower end of the outlet from the reservoir, the stub being shown raised off the shears and started upwardly in the outlet. The tube E is in its elevated position and the fluid pressure cut off from the same and admitted to the upper side of the piston 9.

The tube E may be caused to move upwardly before the shears close, thus attenuating the neck of the gob or assisting in this attenuation. Again the upward movement of the tube may be employed to lift the sheared stub up off the shears before the application of the fluid pressure at the lower end of the outlet to retract and remelt the chilled stub.

In Fig. 7, the shears are still closed and the retraction of the stub is completed, the shear mark being elevated into a zone of remelting heat and the stub turned inside out to eliminate the hardened shear scar.

In Fig. 8 the shears have begun to open, and the retractive impulse has been expended, the glass has resumed its downward travel in the outlet. The tube E is still elevated.

In Fig. 9 the downward flow of glass has reached the lower end of the outlet and in Fig. 10 has begun to protrude therefrom under the influence of gravity. The tube E is still elevated.

In Fig. 11 such protrusion has progressed and the issuing glass will shortly begin to stretch and string out at the neck unless the forcible extrusion of glass is initiated.

In Fig. 12 the automatic valve N has shifted admitting fluid pressure beneath the piston 9 and exhausting it above said piston, thus starting the tube E downwardly and initiating the fluid pressure impulse which extrudes the glass from the orifice at a faster rate than gravity flow, thus maintaining the issuing gob at a uniform diameter.

It is to be noted that the tube is moved downwardly by the same pressure which is employed in the tube to extrude the glass through the outlet and thus the flow passage between the lower end of the tube and the outlet is gradually decreased by the approach of the tube toward the outlet, during the formation and shaping of the suspended gob. This tends to confine the influence of the extrusive pressure to the glass at the outlet.

In Fig. 13 the tube has reached its low position and the extruding pressure impulse is continuing.

In Fig. 14 the valve N again shifts, cutting off the extruding impulse and starting the tube E to rise. Simultaneously or quickly thereafter the fluid pressure is admitted to the blast pipe 55, directing a strong impact of heated air against the neck of the depending gob, thus thinning the neck.

In Fig. 15 the necking blast is cut off and the shears are closing to detach the gob. Meanwhile the tube is approaching its up position.

In Fig. 16 the tube is approaching or has reached its up position, the shears have closed and detached the gob, and the retraction of the stub is about to begin.

In Fig. 4 we show the tube E held stationary in a properly adjusted elevated position to permit the glass to flow under the same to the feeding outlet. Thus the piston 9 is at the top of the cylinder 6 and locked by the nut or nuts 14 and the position of the tube is regulated by adjusting the nuts 12 and 13 on the piston stem 8. The pipe 84 is disconnected and the port 15 and the port 73 of the valve N is plugged.

The cycle of operation is the same except that the tube E is not reciprocated.

In Fig. 5 we show the pipe 85 connected to an orifice 94 provided with a gland 95, in the top of the boot B directly above the feeding orifice D, the fluid pressure impulses for extruding the glass being delivered into the upper portion of the boot instead of into the tube E. In case the tube E is omitted and the impulses are delivered over the surface of the glass, as in Fig. 5, the glass level should be, as shown, above the top of the port 1 to seal the boot against the escape of fluid pressure into the tank as indicated by the dotted line in Fig. 5.

What we desire to claim is:—

1. The process for producing a succession of mold charges of uniform character from a body of molten glass contained in a receptacle having a submerged discharge outlet, which comprises repeating in turn the steps of permitting an initial gravity flow of glass through the outlet, then applying an impulse to the glass above the outlet, then attenuating the neck of the mass of glass suspended from the outlet by applying to said neck a blast of fluid pressure, then severing said neck to detach the mass of glass suspended from the outlet, and remelting the chilled stub by applying at the lower end of the outlet a superatmospheric fluid pressure impulse whereby the stub is forced upwardly within the outlet from a zone of lower temperature into a zone of sufficiently high temperature to remelt the stub by the internal heat of the outlet.

2. The process for producing a succession of mold charges of uniform character from a body of molten glass contained in a receptacle having a submerged discharge outlet, which comprises repeating in turn the steps of permitting an initial gravity flow of glass through the outlet, then applying a superatmospheric fluid pressure impulse to the glass above the outlet, then attenuating the neck of the mass of glass suspended from the outlet by applying to said neck a blast of fluid pressure, then severing said neck to detach the mass of glass suspended from the outlet, and remelting the chilled stub by applying at the lower end of the outlet a superatmospheric fluid pressure impulse whereby the stub is forced upwardly within the outlet from a zone of lower temperature into a zone of sufficiently high temperature to remelt the stub by the internal heat of the outlet.

3. The process for producing a succession of mold charges of uniform character from a body of molten glass contained in a receptacle having a submerged discharge outlet, which comprises repeating in turn the steps of permitting an initial gravity flow of glass through the outlet, then applying an impulse to the glass above the outlet, then attenuating the neck of the mass of glass suspended from the outlet by applying to said neck a blast of burning gases, then severing said neck to detach the mass of glass suspended from the outlet, and remelting the chilled stub by applying at the lower end of the outlet a superatmospheric fluid pressure impulse whereby the stub is forced upwardly within the outlet from a zone of lower temperature into a zone of sufficiently high temperature to remelt the stub by the internal heat of the outlet.

4. The process for producing a succession of mold charges of uniform character from a body of molten glass contained in a receptacle having a submerged discharge outlet, which comprises repeating in turn the steps of permitting an initial gravity flow of glass through the outlet, then applying a superatmospheric fluid pressure impulse to the glass above the outlet, then attenuating the neck of the mass of glass suspended from the outlet by applying to said neck a blast of burning gases, then severing said neck to detach the mass of glass suspended from the outlet, and remelting the chilled stub by applying at the lower end of the outlet a superatmospheric fluid pressure impulse whereby the stub is forced upwardly within the outlet from a zone of lower temperature into a zone of sufficiently high temperature to remelt the stub by the internal heat of the outlet.

5. The process of producing a succession of mold charges of uniform character from a body of molten glass contained in a receptacle having a submerged discharge outlet, which comprises repeating in turn the steps of extruding a mass of glass from the outlet by an impulse applied to the glass above the outlet, attenuating the neck by which the extruded mass of glass is suspended from the outlet by directing against said neck an encircling blast of fluid pressure, detaching the suspended mass of glass by severing the neck in a plane below that of the application of the blast, and then forcing the sheared stub back up into the outlet into a zone of remelting heat by the application of fluid pressure at the lower end of the outlet.

6. The process of producing a succession of mold charges of uniform character from a body of molten glass contained in a receptacle having a submerged discharge outlet, which comprises repeating in turn the steps of extruding a mass of glass from the outlet by an impulse applied to the glass above the outlet, attenuating the neck by which the extruded mass of glass is suspended from the outlet by directing against said neck an encircling blast of burning gases, detaching the suspended mass of glass by severing the neck in a plane below that of the application of the blast, and then forcing the sheared stub back up into the outlet into a zone of remelting heat by the application of fluid pressure at the lower end of the outlet.

7. The process of feeding glass in the form of separate mold charges from a body of molten glass contained in a receptacle provided with a submerged feeding orifice, which consists in extruding the glass through the orifice by means of fluid pressure applied to the upper surface of the glass within the receptacle, attenuating the neck by which the extruded glass is attached to the orifice by directing against said neck from all sides a flame of gaseous fuel, severing the neck to detach the mold charge, and then retracting the stub within the orifice by fluid pressure applied at the lower end of the orifice.

8. The process of feeding glass in the form of separate mold charges from a body of molten glass contained in a receptacle, which consists in extruding the glass through the orifice by means of fluid pressure applied to the upper surface of the glass within the receptacle, attenuating the neck by which the extruded glass is attached to the orifice by directing against said neck from all sides a high pressure flame of gaseous fuel, severing the neck to detach the mold charge while the latter is wholly suspended from the orifice, and then retracting the stub within the orifice by fluid pressure applied at the lower end of the orifice.

9. In apparatus for producing a succession of mold charges of molten glass which are formed and shaped while freely suspended, the combination with a receptacle for the molten glass provided with a submerged discharge outlet, of means for applying impulses of superatmospheric fluid pressure to the glass above the outlet whereby to periodically accelerate the discharge of glass through the outlet, means for attenuating the necks by which the masses of glass are attached to the outlet, shears arranged to periodically close beneath the outlet to sever such necks and detach such masses of glass, and means arranged to be positioned at the lower end of the outlet while the shears remain closed and to apply superatmospheric fluid pressure impulses to the severed stubs to cause the latter to be retracted within the outlet whereby to remelt such stubs by the internal heat of the outlet.

10. In apparatus for producing a succession of mold charges of uniform character, the combination with a receptacle for molten glass provided with a submerged discharge outlet, of means for periodically applying impulses to the glass above the outlet to extrude masses of glass through said outlet, means for applying gaseous flames to the necks by which the masses are attached to the outlet, shears working beneath the outlet to sever such necks, and means for applying fluid pressure to the severed stubs after the shearing operations whereby to retract such stubs within the outlet for remelting.

11. In apparatus for producing a succession of mold charges of uniform character, the combination with a receptacle for molten glass provided with a submerged discharge outlet, of means for periodically applying impulses to the glass above the outlet to extrude masses of glass through said outlet, means for applying a blast of gaseous flames to the necks by which the masses are attached to the outlet, shears working beneath the outlet to sever such necks, and means for applying fluid pressure to the severed stubs after the shearing operations whereby to retract such stubs within the outlet for remelting.

12. In apparatus for producing a succession of mold charges of uniform character, the combination with a receptacle for molten glass having a submerged discharge outlet, a tube within said receptacle and alined with the outlet, common means for periodically applying through said tube fluid pressure impulses to the glass above the outlet whereby to extrude masses of glass through the outlet and for moving said tube toward the outlet during the application of said impulses, and means for subsequently raising said tube, and shears working below the outlet to detach such masses.

13. In apparatus for producing a succession of mold charges of uniform character, the combination with a receptacle for molten glass having a submerged discharge outlet, a tube within said receptacle and alined with the outlet, means for periodically applying through said tube fluid pressure impulses to the glass above the outlet whereby to extrude masses of glass through the outlet, means whereby such applications of fluid pressure cause said tube to move toward the outlet, means for moving the tube away from the outlet, and shears working below the outlet to detach such masses of glass.

14. In apparatus for forming separate mold charges of molten glass, the combination with a receptacle for molten glass having a bottom discharge orifice, of a tube depending within said receptacle in alinement with the discharge orifice, a cylinder moving with said tube, the bores of the tube and the cylinder communicating with each other, a stationary piston on which said cylinder works, and means for admitting fluid pressure to said cylinder on either side of said piston to cause said tube to reciprocate relative to the discharge orifice.

15. In apparatus for forming separate mold charges of molten glass, the combination with a receptacle for molten glass having a bottom discharge orifice, of a tube depending within said receptacle in alinement with the discharge orifice, a cylinder moving with said tube, the bores of the tube and the cylinder communicating with each other, a stationary piston on which said cylinder works, means for admitting fluid pressure to said cylinder on either side of said piston to cause said tube to reciprocate relative to the discharge orifice, and means for simultaneously relieving the fluid pressure on the opposite side of said piston.

16. In apparatus for forming separate mold charges of molten glass, the combination with a receptacle for molten glass having a bottom discharge orifice, of a tube depending within said receptacle in alinement with the discharge orifice, a cylinder moving with said tube, the bores of the tube and the cylinder communicating with each other, a stationary piston on which said cylinder works, means for admitting fluid pressure to either side of the piston to reciprocate the tube relative to the orifice, and means whereby when said tube is lowered fluid pressure is also admitted to the interior of the tube to cause a portion of the glass to be extruded from the discharge orifice.

17. In apparatus for forming separate mold charges of molten glass, the combination with a receptacle for molten glass having a bottom discharge orifice, of a tube depending within said receptacle in alinement with the discharge orifice, a cylinder moving with said tube, the bores of the tube and cylinder communicating with each other, a stationary piston on which said cylinder works, means for admitting fluid pressure to either side of the piston to reciprocate the tube relative to the orifice, means whereby when said tube is lowered fluid pressure is also admitted to the interior of the tube to cause a portion of the glass to be extruded from the discharge orifice, and means whereby when the tube is raised the fluid pressure is relieved from the interior of the tube.

18. In apparatus for forming separate mold charges of molten glass, the combination with a receptacle for molten glass having a bottom discharge orifice, of a tube depending within said receptacle in alinement with the discharge orifice, a cylinder moving with said tube, the bores of said tube and cylinder being in open communication, a stationary piston on which said cylinder works, means for admitting fluid pressure to said cylinder on one side of said piston to raise the tube relative to the discharge orifice, means for adjusting the travel of said cylinder to said piston, and means for simultaneously admitting fluid pressure to the other side of the piston to lower the tube and to the interior of the tube to cause a portion of the glass to be extruded from the receptacle when the tube is lowered.

19. In apparatus for forming separate mold charges of molten glass, the combination with a receptacle for molten glass having a bottom discharge orifice, of a tube depending within said receptacle in alinement with the discharge orifice, a cylinder moving with said tube, the bores of said tube and cylinder being in open communication, a stationary piston on which said cylinder works, means for admitting fluid pressure to said cylinder on one side of said piston to raise the tube, means for regulating the nearness of the tube's approach to the discharge orifice, and means for simultaneously admitting fluid pressure to the other side of the piston to lower the tube and to the interior of the tube to cause a portion of the glass to be extruded from the discharge orifice when the tube is lowered.

20. In apparatus for forming separate mold charges of molten glass, the combination with a receptacle for molten glass having a submerged discharge outlet, a tube depending within the receptacle in alinement with the outlet to control the extrusion of glass from the outlet, and a fluid pressure cylinder and piston mechanism coupled to the tube for moving the tube toward and away from the outlet, the bores of the tube and cylinder being in open communication, of a control valve connected to the opposite ends of the cylinder for the admission of fluid pressure thereto, said valve being arranged when in its one position to admit pressure to the cylinder to raise the tube away from the outlet and when in its other position to admit pressure to the cylinder to lower the tube toward the outlet and to admit pressure to the tube to extrude glass through the outlet.

21. In apparatus for forming separate mold charges of molten glass, the combination with a receptacle for molten glass having a submerged discharge outlet, a tube depending within the receptacle in alinement with the outlet to control the extrusion of glass from the outlet and a fluid pressure cylinder and piston mechanism coupled to the tube for moving the tube toward and away from the outlet, the bores of the tube and cylinder being in open communication, of a control valve connected to the opposite ends of the cylinder for the admission of fluid pressure thereto, said valve being arranged when in its one position to admit pressure to the cylinder to raise the tube away from the outlet and when in its other position to admit pressure to the cylinder to lower the tube toward the outlet and to admit pressure to the tube to extrude glass through the outlet, and timing means controlling the operations of said valve.

22. In apparatus for forming separate mold charges of molten glass, the combination with a receptacle for molten glass having a submerged discharge outlet, a tube depending within the receptacle in alinement with the outlet to control the extrusion of glass from the outlet and a fluid pressure cylinder and piston mechanism coupled to the tube for moving the tube toward and away from the outlet, the bores of the tube and cylinder being in open communication, of a control valve connected to the opposite ends of the cylinder for the admission of fluid pressure thereto, said valve being arranged when in its one position to admit pressure to the cylinder to raise the tube away from the outlet and when in its other position to admit pressure to the cylinder to lower the tube toward the outlet and to admit pressure to the tube to extrude glass through the outlet, timing means controlling the operation of said valve, and means for adjusting the operation of said timing means whereby to regulate the movement operation of said tube.

WILLIAM J. MILLER.
EDWARD A. LAWRENCE.